United States Patent
Wang et al.

(10) Patent No.: US 11,122,531 B2
(45) Date of Patent: Sep. 14, 2021

(54) MITIGATING INTERFERENCE BETWEEN NEIGHBORING CELLULAR COMMUNICATIONS

(71) Applicant: Google LLC, Mountain View, CA (US)

(72) Inventors: Jibing Wang, Mountain View, CA (US); Tibor Boros, Mountain View, CA (US); James Peroulas, Mountain View, CA (US)

(73) Assignee: Google LLC, Mountain View, CA (US)

( * ) Notice: Subject to any disclaimer, the term of this patent is extended or adjusted under 35 U.S.C. 154(b) by 956 days.

(21) Appl. No.: 15/177,911

(22) Filed: Jun. 9, 2016

(65) Prior Publication Data

US 2017/0359790 A1  Dec. 14, 2017

(51) Int. Cl.
  *H04W 56/00* (2009.01)
  *H04J 11/00* (2006.01)
  *H04W 28/04* (2009.01)

(52) U.S. Cl.
  CPC ......... *H04W 56/004* (2013.01); *H04J 11/005* (2013.01); *H04J 11/0056* (2013.01);
  (Continued)

(58) Field of Classification Search
  CPC .............. H04W 28/04; H04W 56/004; H04W 56/0015; H04J 11/005; H04J 11/0056; H04J 11/0059
  See application file for complete search history.

(56) References Cited

U.S. PATENT DOCUMENTS

| 8,982,892 B2 | 3/2015 | Gan et al. |
| 2010/0054237 A1 | 3/2010 | Han et al. |

(Continued)

FOREIGN PATENT DOCUMENTS

| CN | 101594705 A | 12/2009 |
| CN | 103581975 A | 2/2014 |

(Continued)

OTHER PUBLICATIONS

International Search Report and Written Opinion dated Apr. 6, 2017 in PCT Application No. PCT/US2016/069399 (11 pages).

(Continued)

*Primary Examiner* — Jamal Javaid
*Assistant Examiner* — Ryan C Kavleski
(74) *Attorney, Agent, or Firm* — Lerner, David, Littenberg, Krumholz & Mentlik, LLP (57) ABSTRACT

This disclosure provides systems, methods, and apparatus for reducing or avoiding interference between communications of one base station-user equipment pair and communications of another base station-user equipment pair. A first user equipment can monitor a timing offset between the communications and send the timing offset to a first base station that services the first user equipment. The first base station time advances a window of time during which it receives uplink signals from the first user equipment. The base station also sends a time advance value and instructions to the first user equipment to advance a window of time during which the first user equipment transmits uplink signals to the first base station. The timing advance value is based on the timing offset value determined by the first user equipment. Thus, a gap period between uplink and downlink windows is increased, thereby reducing interference.

21 Claims, 8 Drawing Sheets

(52) U.S. Cl.
CPC ......... *H04J 11/0059* (2013.01); *H04W 28/04* (2013.01); *H04W 56/0015* (2013.01)

(56) References Cited

U.S. PATENT DOCUMENTS

| | | |
|---|---|---|
| 2010/0215032 A1 | 8/2010 | Jalloul et al. |
| 2014/0241225 A1* | 8/2014 | Novak .................. H04W 72/02 370/311 |
| 2015/0016428 A1* | 1/2015 | Narasimha ............ H04L 5/0058 370/336 |
| 2015/0181546 A1* | 6/2015 | Freda ................ H04W 56/0015 370/336 |
| 2016/0150492 A1* | 5/2016 | Wang .................... H04W 56/00 370/336 |
| 2016/0360463 A1* | 12/2016 | Kim ..................... H04B 7/0617 |
| 2017/0141859 A1* | 5/2017 | Seo ...................... H04B 17/345 |

FOREIGN PATENT DOCUMENTS

| | | |
|---|---|---|
| WO | 2012134245 A2 | 10/2012 |
| WO | 2013048170 A3 | 5/2013 |
| WO | 2015093892 A1 | 6/2015 |
| WO | 2016023452 A1 | 2/2016 |

OTHER PUBLICATIONS

International Preliminary Report on Patentability under Chapter II dated May 23, 2018 in PCT Application No. PCT/US2016/069399 (21 pages).

Notification of the Second Office Action for Chinese Patent Application No. 201680086438.3 dated Aug. 12, 2020. 3 pages.

Notification of the First Office Action for Chinese Patent Application No. 201680086438.3 dated Mar. 11, 2020. 11 pages.

* cited by examiner

MITIGATING INTERFERENCE BETWEEN NEIGHBORING CELLULAR COMMUNICATIONS

TECHNICAL FIELD

This disclosure relates to the field of communication networks, and in particular communication networks including base stations and user equipment.

DESCRIPTION OF THE RELATED TECHNOLOGY

Communication between base stations and user equipment can be scheduled using a frame structure that includes non-overlapping uplink subframes and downlink subframes. In some implementations, timing of a frame structure associated with one base station-user equipment pair may overlap with a timing of a frame structure associated with a neighboring base station-user equipment pair. This overlap may cause interference in communications between a base station and the user equipment.

SUMMARY

According to one aspect, the subject matter described in this disclosure relates to a method for reducing communication interference. The method includes determining, at a first base station servicing a first user equipment, a synchronization error between a timing of a communication between the first base station and the first user equipment and a timing of a communication between a second base station and a second user equipment, wherein the synchronization error is represented by a timing offset value. The method further includes in response to determining the synchronization error, sending, from the first base station to the first user equipment, a timing advance value and instructions to advance by the timing advance value a window of time during which the first user equipment transmits uplink signals to the first base station, wherein the timing advance value is based on the timing offset value.

According to another aspect, the subject matter described in this disclosure relates to a first base station for communicating with the first user equipment. The base station includes a communication interface configured to send and receive communications. The base station further includes a processor coupled to the communication interface, configured to determine a synchronization error between a timing of a communication between the first base station and a first user equipment and a timing of a communication between a second base station and a second user equipment, wherein the synchronization error is represented by a timing offset value. The processor is further configured to in response to determining the synchronization error, send to the first user equipment a timing advance value and instructions to advance, by the timing advance value, a window of time during which the first user equipment transmits uplink signals to the first base station, wherein the timing advance value is based on the timing offset value.

According to another aspect, the subject matter described in this disclosure relates to a method for reducing interference in a communication network. The method includes determining, at a first user equipment being served by a first base station, a timing offset representing a synchronization error between a timing of a communication between the first base station and the first user equipment and a timing of a communication between a second base station and a second user equipment. The method further includes sending, from the first user equipment to the first base station, the determined timing offset. The method also includes receiving, in response to the sending of the determined timing offset, a timing advance value from the first base station. The method additionally includes advancing, at the first user equipment, by the timing advance value, a window of time during which the first user equipment transmits uplink signals to the first base station, wherein the timing advance value is greater than a propagation delay of signal transmission between the first base station and the first user equipment.

According to another aspect, the subject matter described in this disclosure relates to a first user equipment for communicating with a first base station. The first user equipment includes a transmitter configured to transmit uplink signals to the first base station, the first base station currently servicing the first user equipment, and a receiver configured to receive communication signals from the first base station and communication signals from a second base station. The user equipment further includes a processor coupled to the transmitter and receiver, configured to determine a timing offset representing a synchronization error between a timing of the communication signals received from the first base station and a timing of the communication received from the second base station. The processor is further configured to send, via the transmitter, the determined timing offset to the first base station. The processor is also configured to receive, in response to sending of the determined timing offset, a timing advance value from the first base station. The processor is further configured to advance, by the received timing advance value, a window of time during which uplink signals are transmitted to the first base station, wherein the timing advance value is greater than a propagation delay of signal transmission between the first base station and the first user equipment.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

Figure 1:
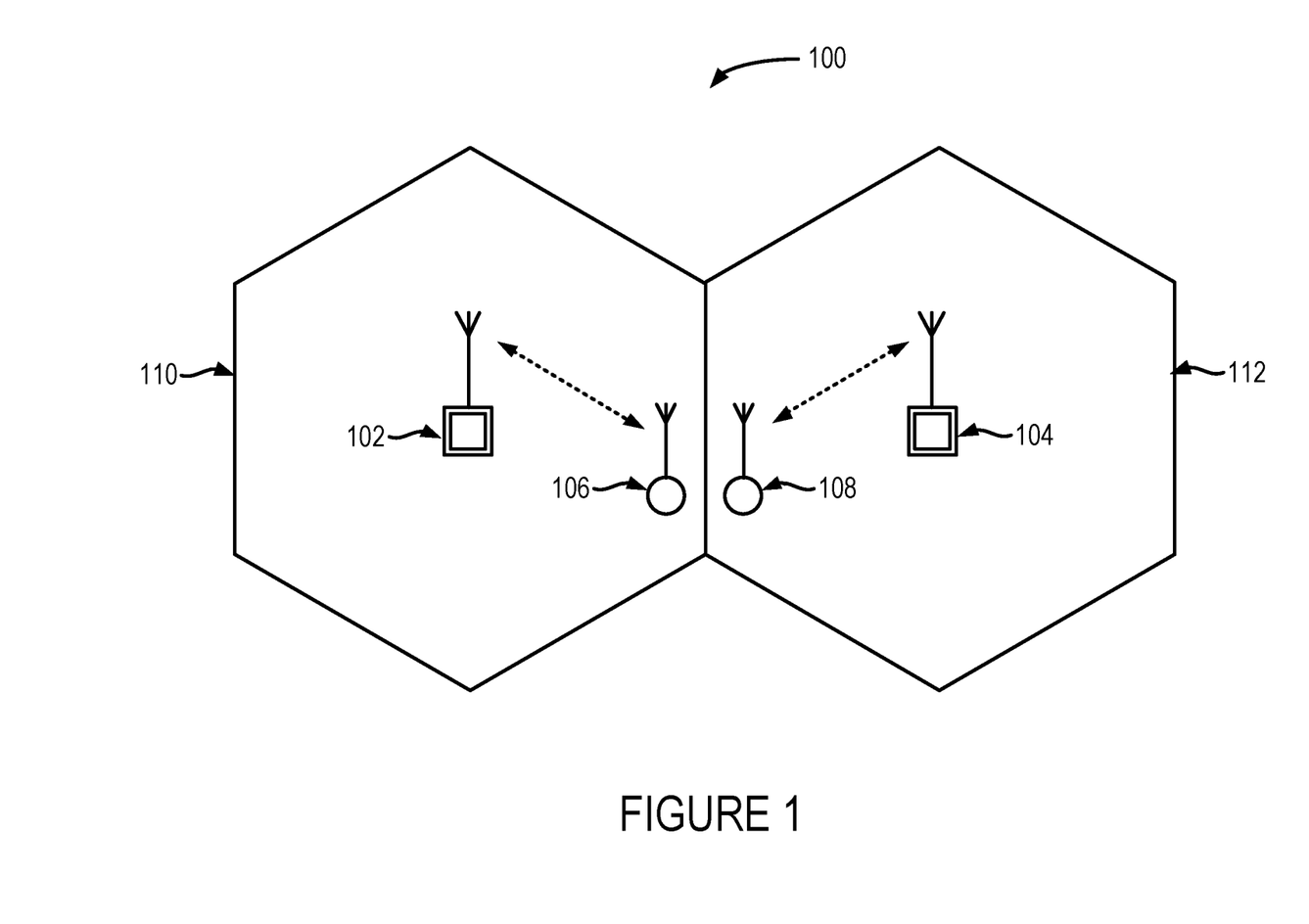
FIG. 1 shows an example communication system.

FIG. 1 shows an example communication system 100. The communication system 100 includes a first base station ("BS1") 102, a second base station ("BS2") 104, a first user equipment ("UE1") 106, and a second user equipment ("UE2") 108. BS1 102 provides radio communications to one or more user equipment, such as UE1 106, while BS2 104 provides radio communications to one or more user equipment, such as UE2 108. Generally, BS1 102 can provide radio communications to various user equipment within a geographical area or cell 110, and similarly BS2 104 can provide radio communications to various user equipment within its own geographical area or cell 112. BS1 102 and BS2 104 can communicate with respective user equipment using various radio communication technologies such as Global System for Mobile Communications ("GSM"), Enhanced Data rates for GSM Evolution ("EDGE"), Universal Mobile Telecommunication System ("UMTS"), Code Division Multiple Access ("CDMA"), Time Division Synchronous Code Division Multiple Access ("TD-SCDMA"), High Speed Packet Access ("HSPA"), Long-Term Evolution ("LTE"), LTE Advanced, Long-Term Evolution Time-Division Duplex ("LTE-TDD"), or any other such protocol including, but not limited to, so-called "3G," "4G," and "5G" protocols.

Figure 2:
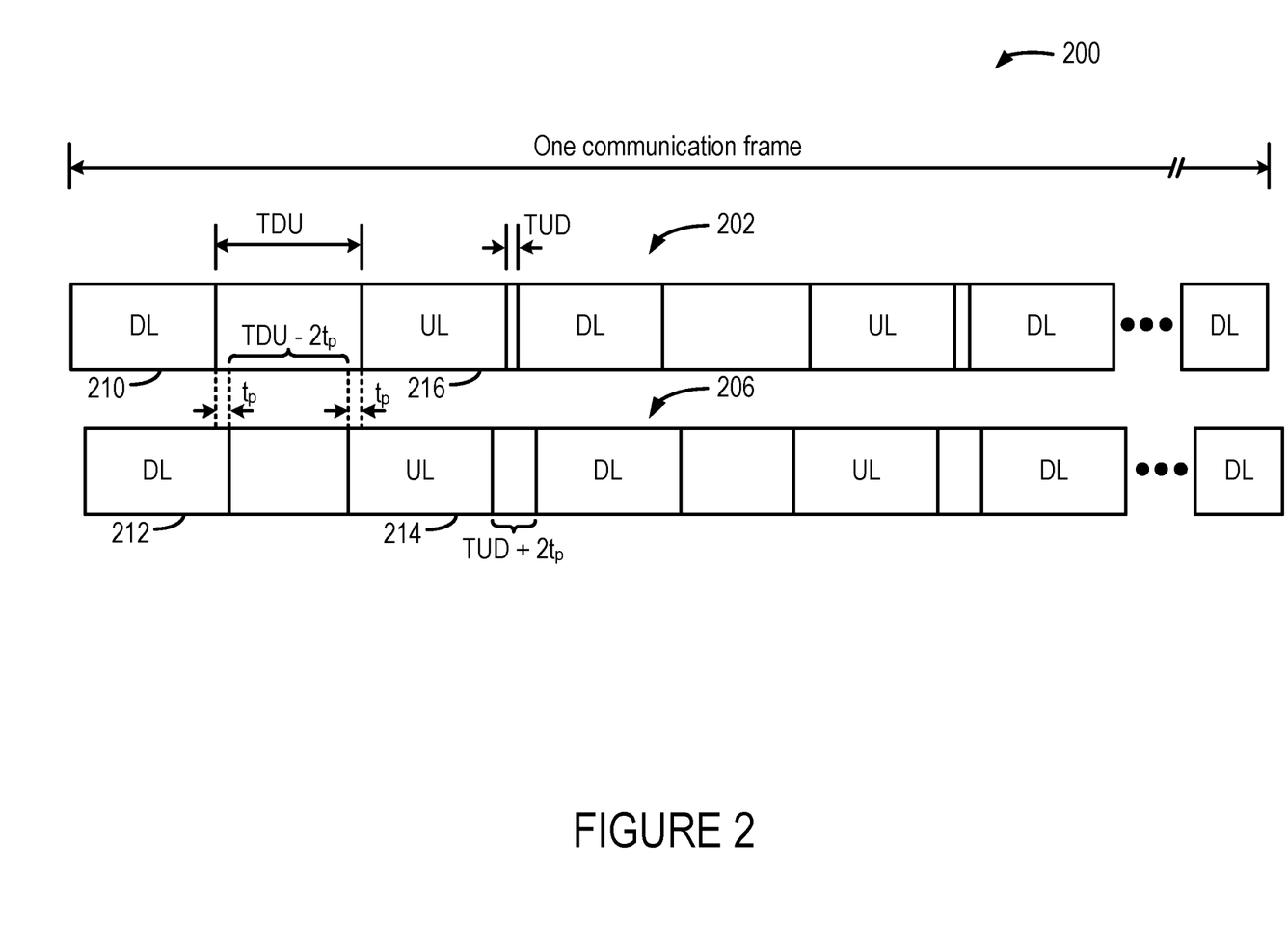
FIG. 2 shows an example communication frame structures that can be utilized for communication between a base station and user equipment.

FIG. 2 shows example communication frame structures 200 that can be utilized for communication between a base station and user equipment. In particular, the frame structures shown in FIG. 2 can be utilized for communication between BS1 102 and UE1 106. FIG. 2 shows a base station frame structure 202 corresponding to BS1 102 and a user equipment frame structure 206 corresponding to UE1 106. While the frame structures 200 represents only one communication frame, BS1 102 and UE1 106 can utilize a series of communication frames having frame structure similar to the frame structure 200 shown in FIG. 2.

Both the BS1 frame structure 202 and the UE1 frame structure 206 include several subframes during which BS1 102 and UE1 106 can send and receive communication. For example, each of the BS1 frame structure 202 and the UE1 frame structure 206 includes several downlink ("DL") and uplink ("UL") subframes. During a DL subframe, BS 1 102 transmits information to UE1 106. In particular, during the DL subframe BS1 102 enables its transmitter(s) to transmit information while UE1 106 enables its receiver(s) to receive the information transmitted by BS1 102. Conversely, during an UL subframe, UE1 106 transmits information to BS1 102. Thus, during the UL subframe, UE1 106 enables its transmitter(s) to transmit information to BS1 102, while BS1 102 enables its receiver(s) to receive the information transmitted by UE1 106. By including several UL and DL subframes within a frame structure, BS1 102 and UE1 106 can effectively exchange data and control signals.

The BS1 frame structure 202 also can include guard periods, such as a DL to UL guard period (referred to hereinafter as "TDU period") and UL to DL guard period (referred to hereinafter as "TUD period"). At BS1 102, the TDU period can provide adequate time ($t_{TX-RX}$) to power-down its transmitter, which is enabled to transmit signals during the preceding DL subframe, and power-up its receiver, which is to be enabled to receive signals from UE1 106 during the following UL subframe. The TDU period is also utilized to accommodate round-trip propagation delays ($2 \times t_p$) associated with the transmission of signals to and from UE1 106. Typically, the TDU period can define a maximum propagation delay ($t_{p-max}$) it can accommodate taking into consideration time $t_{TX-RX}$. The maximum propagation time can represent the farthest user equipment the base station can service, and can also define the size of the cell 112 serviced by BS1 102. At UE1 106, during the TDU period, the receiver of UE1 106 is powered-down and its transmitter is powered-up. Therefore, TDU period should account for the delay in powering-down the receiver and powering-up the transmitter at the UE1 106. In addition, UE1 106 can time advance the following UL subframe so that signals transmitted during the UL subframe from UE1 106 arrive at BS1 102 at a prescribed time.

The TUD period allows BS1 102 and UE1 106 to effectively switch from an UL subframe to an DL subframe. Specifically, at BS1 102, the TUD period is utilized to power-down its receiver, which is enabled to receive signals from UE1 106 during the preceding UL subframe, and to power-up its transmitter, which is to be enabled to transmit signals to UE1 106 during the following DL subframe. At UE1 106, during the TUD period, UE1 106 powers down its transmitter and powers-up its receiver to receive signals from BS1 102 during the following DL subframe.

As mentioned above, the TUD period can be utilized to accommodate propagation delays in communicating signals between BS1 102 and UE1 106. For example, as shown in FIG. 2, the signals transmitted during the DL subframe 212 of the BS1 frame structure 202 arrive at UE1 106 after a propagation delay of $t_p$. Similarly, signals transmitted during other DL subframes of the BS1 frame structure 202 also arrive at UE1 106 after the propagation delay of $t_p$. Generally, it is preferable that the signals transmitted from all user equipment serviced by a base station arrive at the base station at roughly the same time. Thus, user equipment at various distances from the base station begin transmitting uplink signals early, taking into account their respective propagation delays, so that they arrive at the base station at about the same time. This process of transmitting uplink signals early is called timing advance. For example, in FIG. 2, UE1 106 transmits signals during the UL subframe 214 early by the propagation delay $t_p$ such that they are received at the desired time during the UL subframe 216 at BS1 102. The determination of the duration of timing advance, and if the propagation delay is used for the time advance, the initial magnitude of the propagation delay, can be determined at the outset of the establishment of communication between BS1 102 and UE1 106. In some implementations, the base station can determine the propagation delay on behalf of all the user equipment that the base station services, and then communicates respective time advance values to each user equipment.

As mentioned above, the TDU period can be selected to accommodate the time required by the UE to power-down the receiver and power-up the transmitter and the maximum round-trip propagation delay ($2 \times t_{p-max}$) of the farthest user equipment serviced by the base station. In some implementations, where the base station and the user equipment are deployed in relatively small cells, the propagation delay $t_p$ can be substantially smaller than the TDU period. In some such implementations, even after accounting for the time advance of the farthest user equipment and the time required by the UE for powering down the receiver and powering-up the transmitter, a substantial portion of the TDU period can remain unused. In some implementations, as discussed further below, the unused portion of the TDU period can be used to relax the synchronization margins between frame structures of neighboring cells.

By utilizing the example frame structures 200 shown in FIG. 2, BS1 102 and UE1 106 can effectively communicate data and control signals to establish and maintain communications. While the frame structure 200 shown in FIG. 2 is discussed in relation to the communication between BS1 102 and UE1 106, similar frame structure can be utilized for communication between BS2 104 and UE2 108. In some implementations, to minimize interference, it is preferable that base stations and user equipment in neighboring cells utilize similar frame structures and be synchronized in the time domain. In particular, interference between signals transmitted by a base station or a user equipment in one cell and signals received by base stations or user equipment in one or more neighboring cells can be reduced or avoided by using the same frame structure for all neighboring base stations and user equipment and synchronizing their timing. In some implementations, if the relative timings of the UL and DL subframes in one cell and that in a neighboring cell are not synchronized, interference can occur. Additional details of such interference between base stations and user equipment in neighboring cells is discussed below in relation to FIG. 3.

In some implementations, frame structures other than the frame structure 200 can be utilized. For example, the LTE-TDD protocol specifies seven different configurations of frame structure, each configuration having a different number and sequence of UL and DL subframes. The LTE-TDD also specifies the period of each subframe to be about 1 ms and the period of one communication frame to be about 10 ms. In some implementations, the special subframe (S) specified in LTE-TDD can be utilized to implement the TDU period between the DL and the UL subframes in the frame structure 200. Specifically, a guard period (GP) included in the special subframe in LTE-TDD can be utilized for implementing the TDU period.

Figure 3:
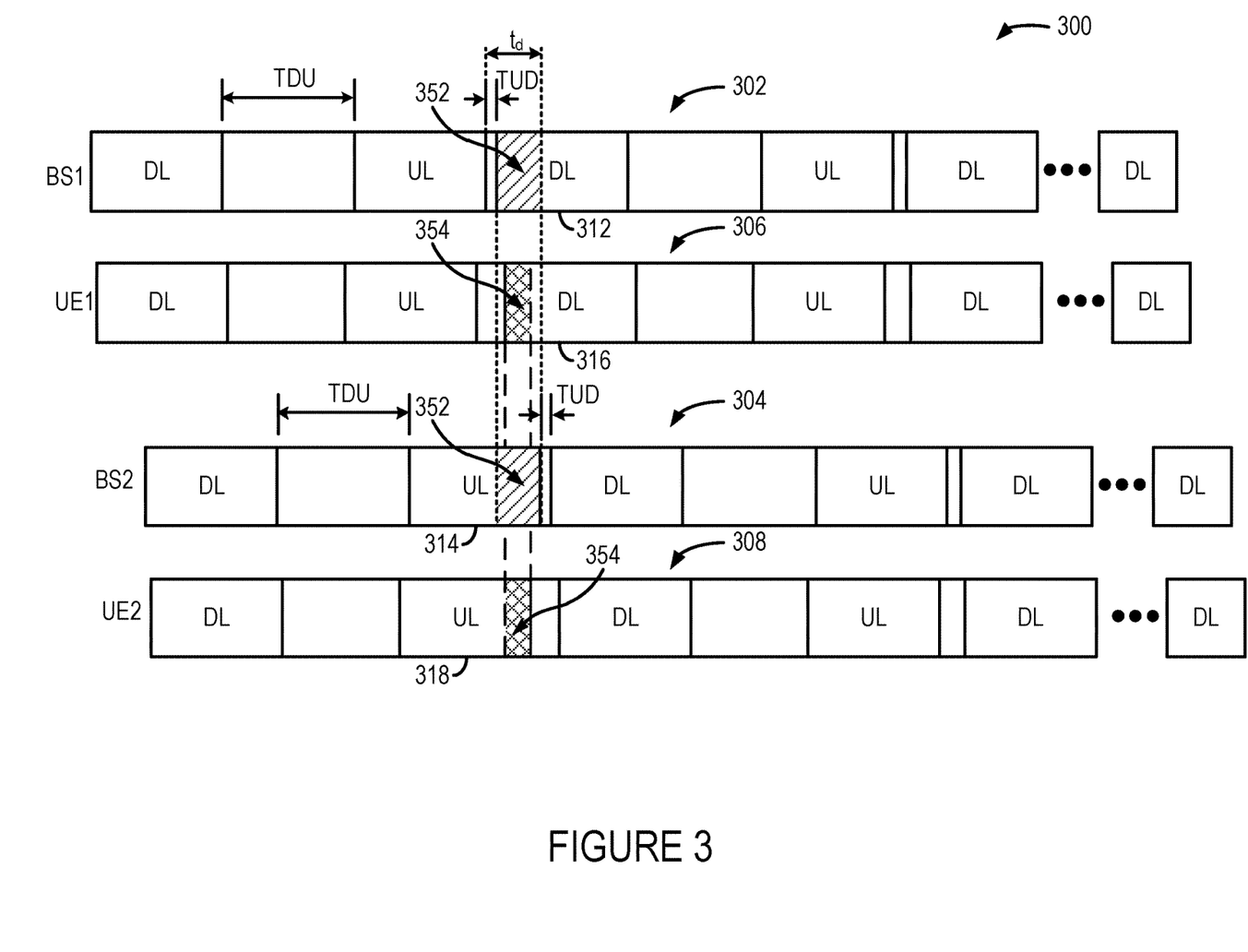
FIG. 3 shows a timing diagram of communications between base stations and user equipment in neighboring cells shown in FIG. 1.

FIG. 3 shows a timing diagram 300 of communications between base stations and user equipment in neighboring cells shown in FIG. 1. In particular, FIG. 3 shows a BS1 frame structure 302 associated with BS1 102 shown in FIG. 1, a BS2 frame structure 304 associated with BS2 104 shown in FIG. 1, a UE1 frame structure 306 associated with UE1 106 shown in FIG. 1, and a UE2 frame structure 308 associated with UE2 108 shown in FIG. 1. The BS1 frame structure 302 and the UE1 frame structure 306 are similar to the BS1 frame structure 202 and the UE1 frame structure 206, respectively shown in FIG. 2. Further, the BS2 frame structure 304 and the UE2 frame structure 308 are substantially similar to the BS1 frame structure 302 and the UE1 frame structure 306.

Even though the two neighboring base station user equipment pairs use the same frame structure for communication, lack of synchronization between their frame structures can cause interference. For example, referring to FIG. 3, while the BS2 frame structure 304 is similar to the BS1 frame structure 302, the BS2 frame structure 304 is not synchronized with the BS1 frame structure 302. Specifically, using the beginning of the respective TUD period in each frame structure as reference, the BS2 frame structure 304 is offset, in time, with respect to the BS1 frame structure 304 by $t_d$. Assuming UE1 106 and UE2 108 are substantially the same distance from their respective base stations BS1 102 and BS2 104, respectively, the timing of the UE1 frame structure 306 will be substantially aligned with the timing of the UE2 frame structure 308, as shown in FIG. 3. Therefore, the timing of the UE2 frame structure 308 also will be offset by $t_d$ from the timing of the UE1 frame structure 306. In some implementations, if UE1 106 and UE2 108 are located at different distances from their respective base stations, then the propagation delay of signals between UE1 106 and the respective base station BS1 102 will be different from the propagation delay of signals between UE2 108 and the respective base station BS2 104. In some such implementations, the timing offset between the UE1 frame structure 306 and the UE2 frame structure 308 can be different than $t_d$. While FIG. 3 shows overlap between only selected set of UL and DL subframes, similar overlap can be observed between other UL and DL subframes of the base station and user equipment frame structures.

The offset time $t_d$ between the timing of the base station and the user equipment frame structures of neighboring cells can result in two kinds of interferences. First, the offset can result in an interference between the two base stations. For example, referring to FIG. 3, a DL subframe 312 of the BS1 frame structure 302 overlaps with the UL subframe 314 of the BS2 frame structure 304. This overlap is indicate by shaded base station overlap regions 352. As discussed above, during the DL subframe, a base station enables its transmitter(s) to transmit signals to the user equipment, while in the UL subframe, the base station enables its receiver(s) to receive signals from the user equipment. Due to the overlap between the DL subframe 312 and the UL subframe 314, BS1 102 will be transmitting signals while BS2 104 is receiving signals. Therefore, the signals transmitted by BS1 102 can interfere with the user equipment signals being received by BS2 104 during the base station overlap regions 352. In some implementations, the extent of the interference can be a function of the distance between the base stations. For example, the degree of interference can increase with the decrease in distance between the base stations.

The timing offset $t_d$ can also result in interference between the user equipment. For example, referring to FIG. 3, the DL subframe 316 of the UE1 frame structure 306 can overlap with the UL subframe 318 of the UE2 frame structure 308. This overlap is indicated by shaded user equipment overlap regions 354. As a result, during the user equipment overlap regions 354, UE1 106 is receiving, while UE2 108 is transmitting, thereby causing interference between the signals transmitted by UE2 108 and the base station signals received by UE1 106. In some implementations, similar to the degree of interference between base stations, the degree of interference between the user equipment can be a function of the distance between the interfering user equipment. The degree of interference can increase with the decrease in the distance between the user equipment. For example, in some implementations, where the interfering user equipment are located closely and near the edges of their respective cells, such as UE1 106 and UE2 108 shown in FIG. 1, the degree of interference can be severe, and cause the user equipment to loose communication with their respective base stations.

One approach to minimizing interference is to synchronize the timing between the frame structures of the base stations and the user equipment. For example, referring to FIG. 3, the timing offset $t_d$ could be minimized or removed by aligning the beginning of the TUD of the BS1 frame structure 302 with the beginning of the TUD of the BS2 frame structure 304. Aligning the timing of two base stations can require the base stations to communicate timing information with a timing master, or for each base station to determine their timing based on a common timing source. For example in some implementations, backhaul linkscan be utilized to provide timing information. Technologies such as IEEE 1588 provide network synchronization using synchronization packets exchanged between the base stations and a timing master over the backhaul link. However, packet delays and asymmetric TCP load in traditional backhaul transport networks can make it challenging to maintain good timing synchronization. In some other implementations, each base station can be equipped with global positioning system (GPS) receivers. In some such implementations, each base station can adjust its timing with respect to the timing of the commonly received GPS signals. However, in implementations where base stations are deployed indoors, or in dense urban environments, faithful reception of the GPS signals can be difficult. Moreover, equipping each base station with a GPS receiver and the associated hardware can be cost prohibitive.

The difficulty in aligning the timing of the frame structures of base stations is exacerbated by the strict margins of synchronization imposed by practical considerations. For example, in some implementations, where base stations utilize long-term evolution (LTE) time domain duplex (TDD) techniques for communication, the TUD period can be about 20 µs. Moreover, in some implementations, base stations can take about 15-17 µs to switch from uplink to downlink, i.e., switching off their receiver(s) and subsequently enabling their transmitter(s) for the following downlink subframe. Thus, the base stations have to be aligned to within about 3-5 µs of each other. Synchronizing the timing of the base station frame structures to within 3-5 µs of each other can, in some implementations, be quite difficult. For example, it can be difficult to achieve 3-5 µs margin of synchronization using the above discussed backhaul and GPS techniques. In some implementations, more precise backhaul and GPS techniques could be employed to achieve the strict margins, but such precise techniques can be undesirable due to increased costs in their implementation and deployment.

The following discussion presents techniques that can be utilized by neighboring base stations to reduce or eliminate interference due to lack of synchronization. In particular, the techniques discussed below can be utilized by the base stations to re-align UL and/or DL subframes of one or more base stations such that the overlap between UL and DL subframes of frame structures associated with base stations and user equipment can be reduced or removed. The techniques discussed below also relax the margins of synchronization imposed on the system, allowing the utilization of low cost synchronization techniques.

Figure 4:
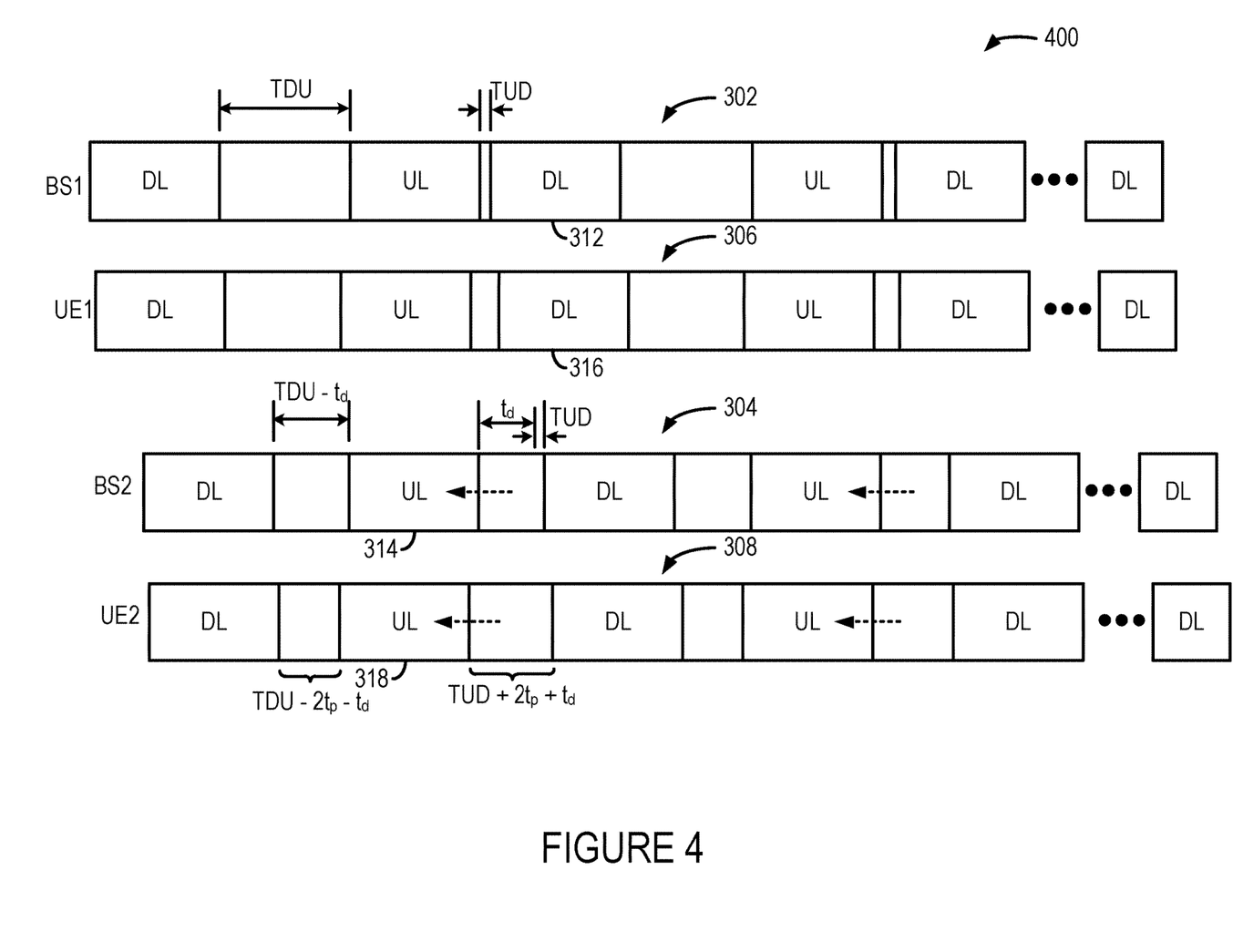
FIG. 4 shows another timing diagram of communications between base stations and user equipment in neighboring cells shown in FIG. 1.

FIG. 4 shows another timing diagram 400 of communications between base stations and user equipment in neighboring cells shown in FIG. 1. In particular, FIG. 4 shows the frame structures of the base station and the user equipment resulting from the application of an interference mitigation technique. The timing diagram 400 includes the BS1 frame structure 302, the UE1 frame structure 306, the BS2 frame structure 304 and the UE2 frame structure 308. However, the BS2 frame structure 304 and the UE2 frame structure 308 are modified such that there is no interference between the subframes in the BS2 and UE2 frame structures with the subframes in the BS1 or UE1 frame structures. Specifically, the UL subframes of the BS2 frame structure 304 and the UE2 frame structure 308 are adjusted based on the timing offset $t_d$. As a result, the UL subframes in the BS2 frame structure 304 and the UE2 frame structure 308 end prior to the beginning of the DL subframes in the BS1 frame structure 302 and the UE1 frame structure 306. The UL subframe 314, which interfered with the DL subframe 312 of the BS1 frame structure 302, is advanced in time by the timing offset $t_d$. Thus, the window during which BS2 104 receives uplink subframes is advanced by the timing offset $t_d$. Moreover, the timing advance of the UL subframe 318 in the UE2 frame structure 308, which was initially time advanced based only on the propagation delay $t_p$, is time advanced based additionally on the timing offset $t_d$. Thus, the timing advance of the UL subframe 318 is now equal to $t_p+t_d$, instead of only $t_p$. The additional timing advance results in the UL subframe 318 ending before the start of the DL subframe 316 in the UE1 frame structure 306.

Figure 5:
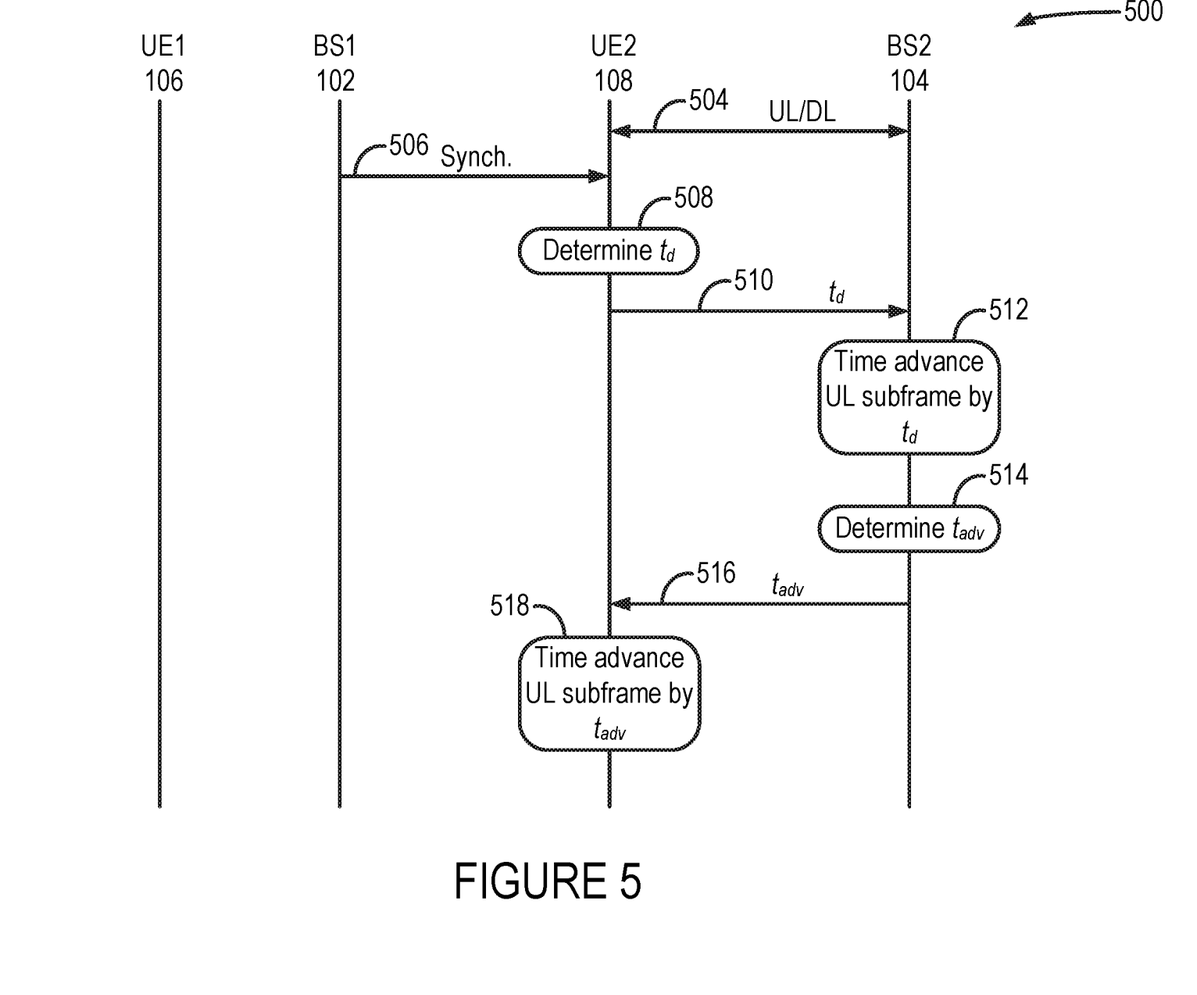
FIG. 5 shows a signal diagram depicting the exchange of signals between base stations and user equipment in neighboring cells to address interference.

FIG. 5 shows a signal diagram 500 depicting the exchange of signals between base stations and user equipment in neighboring cells to address interference. In particular, FIG. 5 shows communications signals between BS1 102, UE2 108 and BS2 104 shown in FIG. 1. UE2 108 and BS2 104 having established a communication 504, can exchange data and control information using the UE2 frame structure 308 and the BS2 frame structure 304 shown in FIG. 3. While UE2 108 is communicating with BS2 104, UE2 108 can also listen to broadcast signals transmitted by BS1 102. These signals are typically transmitted by every base station to allow user equipment to establish a connection with the base station. For example, a user equipment entering the cell serviced by the base station can listen to broadcast synchronization signals transmitted by the base station to trigger a handover from the currently serving base station of a neighboring cell. Typically, the synchronization signals transmitted by the base station can include information such as cell ID, symbol timing, frame timing. For example, for systems utilizing the LTE suite of protocols for communication, the base station can transmit primary and secondary synchronization signals that include at least the above-listed information, which a user equipment can utilize to communicate with the base station. UE2 108 receives synchronization signals 506 transmitted by BS1 102 and compares the timing information included in the synchronization signals 506 with the timing information used for the communication 504 with BS2 104. In particular, UE2 108 determines (508) the timing offset $t_d$ between the frame structure timing of BS1 102 and that of BS2 104.

UE2 108 can alert (510) BS2 104 that there is a timing offset between the timing of the frame structure of BS2 104 and that of BS1 102. UE2 108 also can transmit the timing offset $t_d$ to BS2 104, which can utilize the timing offset $t_d$ to adjust the timing of the UL subframes. In some implementations, UE2 108 may refrain from alerting BS2 104 if the timing offset is less than a threshold value, such as, for example, about 0.5 µs to about 1.5 µs. In particular, BS2 104 can time advance its UL subframe (512), which is the UL receiving window, by the timing offset $t_d$. For example, as shown in FIG. 4, the UL subframe 314 in the BS2 frame structure 304 is time advanced by $t_d$.

In addition, BS2 104 can determine (514) the timing advance $t_{adv}$ based not only on the propagation delay associated with UE2 108, but also on the timing offset $t_d$. For example, BS2 104 can add the timing offset $t_d$ received from UE2 108 to the propagation delay ($t_p$) to determine the timing advance $t_{adv}$ for the UL subframes associated with UE2 108.

BS2 104 can communicate (516) the determined timing advance $t_{adv}$ to UE2 108. In response, UE2 108 can time advance its UL subframe by a time advance $t_{adv}$, which is based on the propagation delay ($t_p$) of the signal transmission between UE2 108 and BS2 104 and the timing offset $t_d$ between the frame structures of BS1 102 and BS2 104. For example, referring to FIG. 4, UE2 108 can time advance the UL subframe 318 by $t_p+t_d$. The other UL subframes in the UE2 frame structure 308 also can be time advanced by the same duration. It is noted that in technologies such as LTE-TDD, base stations are configured to send time advance duration to user equipment to have the user equipment time advance their respective UL subframes. However, unlike these technologies where the timing advance is based only on the propagation delays of the signal transmissions between the base station and the user equipment, BS2 104 determines the timing advance based on both the propagation delay and the timing offset $t_d$ between the timing of the frame structure of BS2 104 and that of BS1 102.

By adjusting the timing of the UL subframes by $t_p+t_d$, the base station to base station interference (352 in FIG. 3) and the user equipment to user equipment interference (354 in FIG. 3) can be reduced or removed. The adjustment of the timing of the UL subframes may reduce the TDU period by $t_d$, as shown in FIG. 4. This, in turn, reduces the maximum propagation delay of signals between the base station and the user equipment the base station can support. However, in small cell networks, such as femto- or pico-cells, where the radii of the cells is generally small (e.g., about 10 m to about 200 m), the reduction in the maximum allowable propagation delay may not affect the ability of the base stations to service user equipment within their respective cells.

In some implementations, where each base station serves more than one user equipment, respective timing advance durations $t_{adv}$ can be sent to each user equipment serviced by the base station. The $t_{adv}$ sent to each user equipment can be based on the same timing offset $t_d$ between the timing of the frame structure of BS2 104 and that of BS1 102 and the propagation delay associated with that user equipment.

In some implementations, where the LTE-TDD protocols are utilized for communication, user equipment that do not have an established connection with the base station can use a random access channel (RACH) to communicate with the base station. The RACH allows the user equipment to initiate communication with the base station when it is first powered on, when it is in the process of regaining a lost connection or lost timing synchronization, or when it is in the process of a handover from a connection with a different base station. However, the RACH communications, are typically not time advanced. Therefore, uplink and downlink subframes over the RACH can cause interference with uplink and downlink subframes of a neighboring cell. In some implementations, the base station can include time advance information within its system information, which are broadcast by the base stations. The user equipment can acquire the timing advance information from the broadcast system information, and advance the timing of the RACH based on the acquired timing advance information.

Any user equipment can be configured to carry out the determination of the offsets between the timing of the frame structure of the base station the user equipment is currently connected to and the timing of the frame structures of neighboring base stations. In some implementations, if the user equipment can report the various timing offsets to the serving base station. The serving base station can determine the maximum offset reported by the user equipment, and determine the timing advance based on the determined maximum offset. In this manner, each base station can receive timing offset values from one or more of their respective user equipment, and adjust their respective timing advance value accordingly to reduce or remove interference.

In some implementations, the user equipment can alert the serving base station of an offset only if it determine that the timing of the frame structure of the serving base station is delayed with respect to the timing structure of one or more neighboring base stations. The serving base station can then issue timing advance values to all the user equipment served by the base station based on the received offset value.

In some implementations, the base station can detect interference by monitoring the communication between the base station and the user equipment. For example, referring to FIG. 3, the timing of the BS1 frame structure 302 is early with respect to the timing of the BS2 frame structure 304. As the BS1 frame structure 302 is early, interference occurs during the DL subframe 312. In contrast, as the BS2 frame structure 304 is late, the interference occurs during the UL subframe 314. In some implementations, BS1 102, upon detecting interference in its DL subframes, can infer that the interference is due to a unsynchronized base station, such as BS2 104. Accordingly, BS1 102 can communicate with BS2 104 over backhaul links (such as, for example, the X2 link used in LTE) and request BS2 104 to time advance its UL subframes.

In some implementations, a base station can implement default timing advance to mitigate interference. For example, unlike the process shown in FIGS. 3-5, where BS2 104 advances the timing of its UL subframes based on the value of the timing offset $t_d$ determined by UE2 108, in some implementations, BS2 104 can advance the timing of the UL subframes by a default value independently of the determined value of the timing offset. BS2 104 can still rely on UE2 108 to detect the offset and alert BS2 104 that there is potential interference. However, BS2 104 can ignore the value of the timing offset received from UE2 108, and instead advance the timing of the UL subframes based on a default timing offset to determine a default timing advance value. In some such implementations, the default timing offset can be predetermined based on tests carried out on the network. The value of the default timing offset can be selected to be greater than the largest timing offset or synchronization offset that can be expected to occur between neighboring base stations. In some implementations, the user equipment can be configured to merely alert the serving base station that it has detected a timing offset, without communicating the value of the timing offset to the base station. In some implementations, each base station can incrementally time advance its UL subframes until it stops receiving alerts from the user equipment.

Figure 6:
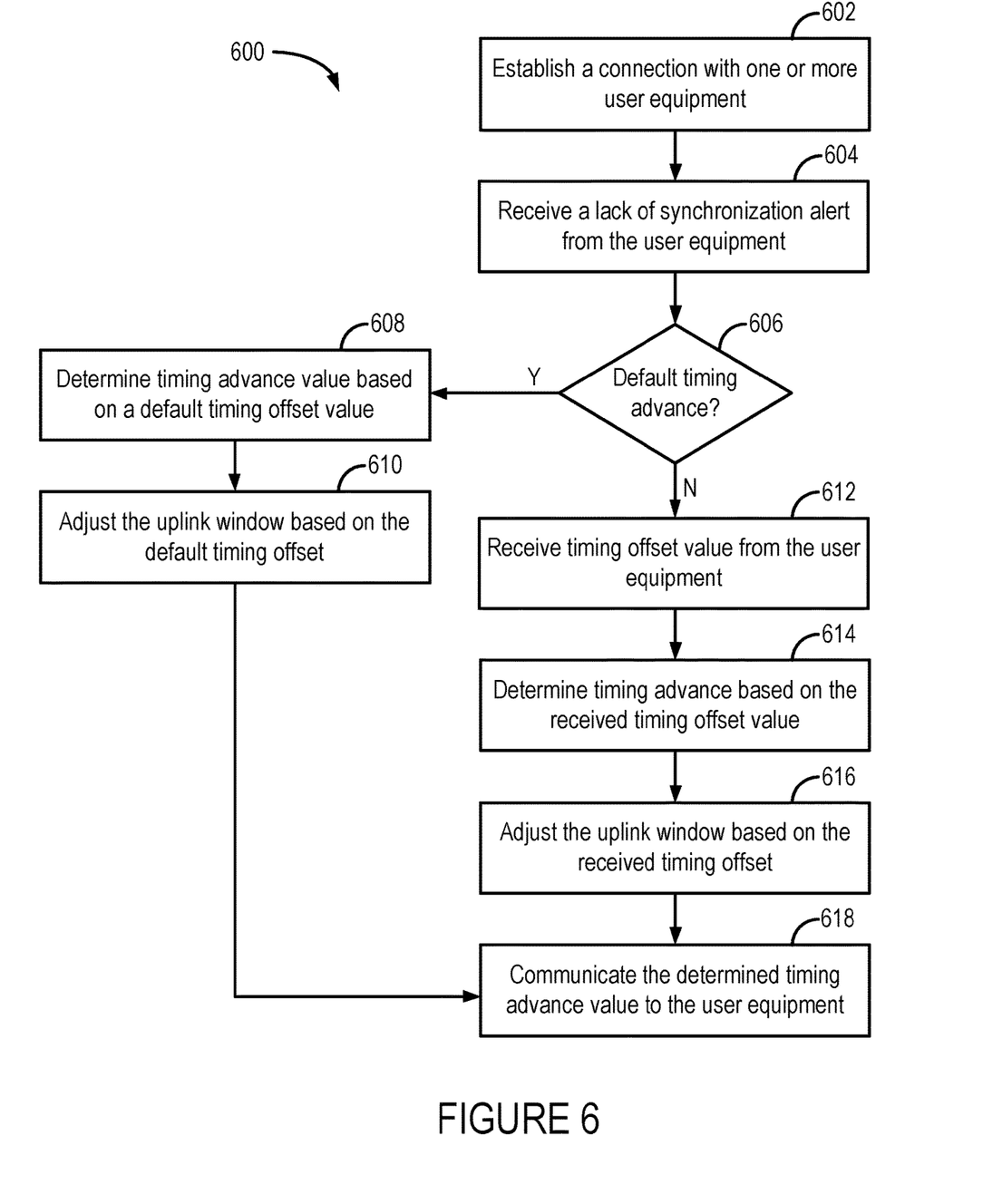
FIG. 6 shows a flowchart of an example process to be executed by a base station for mitigating interference.

FIG. 6 shows a flowchart of an example process 600 for mitigating interference. In particular, the process 600 can be executed by a base station, such as the base stations BS1 102 and BS2 104. The process 600 includes establishing a connection with one or more user equipment (stage 602). The process 600 also includes receiving a lack of synchronization alert from the user equipment (stage 604). If the timing advance mode is a default timing advance mode (stage 606) the process 600 includes determining the timing advance value based on a default timing offset value (stage 608), and adjusting the timing of an uplink window at the base station based on the default timing offset (stage 610). However, if the timing advance mode is not the default timing advance mode (stage 606), then the process 600 includes receiving the timing offset value from the user equipment (stage 612), determining the timing advance value based on the received timing offset value (stage 614), and adjusting the timing of the uplink window based on the received timing offset value (stage 616). The process 600 also includes communicating the determined timing advance value to the user equipment (stage 618).

As mentioned above, the process 600 includes establishing a connection with one or more user equipment (stage 602). Examples of this process stage have been discussed above in relation to FIGS. 1-5. For example, FIG. 3 shows BS2 104 and UE2 108 communicating over an established connection, over which BS2 104 and UE2 108 exchange data and control information using UL and DL subframes. The process 600 further includes receiving a lack of synchronization alert from the user equipment (stage 604). One example of this process stage has been discussed above in relation to FIG. 5. For example, as shown in FIG. 5, UE2 108 determines that there is an offset $t_d$ between the timing of the frame structure of BS2 104 and that of BS1 102, and alerts BS2 104 of this timing offset.

The process also includes determining whether the base station is operating in a default timing advance mode (stage 606). As discussed above, the base station can be configured to advance the timing of the UL subframes to mitigate interference based either on the timing offset value received from the user equipment or based on a default timing offset value. If the base station is operating in a default timing advance mode, the base station can determine the timing advance value based on the default timing offset value (stage 608). Further, the base station can adjust the uplink window, during which it receives uplink signals from the user equipment by the default timing offset (stage 610). For example, referring to FIG. 4, instead of adjusting the timing of UL subframe 314 in the BS2 frame structure 304 by the offset value $t_d$ received from UE2 108, BS2 104 can adjust the timing of the UL subframe 314 by a default offset value.

Alternatively, if the base station is not operating in a default timing advance mode, the process 600 includes receiving the timing offset value from the user equipment (stage 612). One example of this process stage has been discussed above in relation to FIG. 5. For example, UE2 108 can communicate (510) the determined timing offset $t_d$ to BS2 104. The process 600 further includes determining the timing advance based on the received timing offset value (stage 614). For example, as shown in FIG. 4, BS2 104 determines the timing advance of the UL subframe 318 based on the received timing offset value $t_d$. Further BS2 104 adjusts the timing of the UL subframe 314 based on the received timing offset value $t_d$ (stage 616).

The process also includes communicating the determine timing advance value to the user equipment (stage 618). One example of this process stage has been discussed above in relation to FIG. 5. For example, BS2 104 communicates the timing advance value $t_{adv}$ to UE2 108, which utilizes the timing advance value to adjust the timing of its UL subframes. If the base station is operating in a default timing advance mode, the base station can communicate the timing advance value $t_{adv}$, instead, based on the default timing offset value. In some implementations, the base station, in response to determining a synchronization error, can instruct all other base stations to advance their respective UL subframes by the same timing advance value. For example, UE1 106 can instructions to one or more neighboring base stations to advance their UL subframes by the timing advance value $t_{adv}$. The neighboring base stations can then utilize the timing advance value to instruct their respective user equipment to time advance uplink subframes by the timing advance value. In some implementations, UE 106 can send the instructions to the neighboring base stations over backhaul links.

Figure 7:
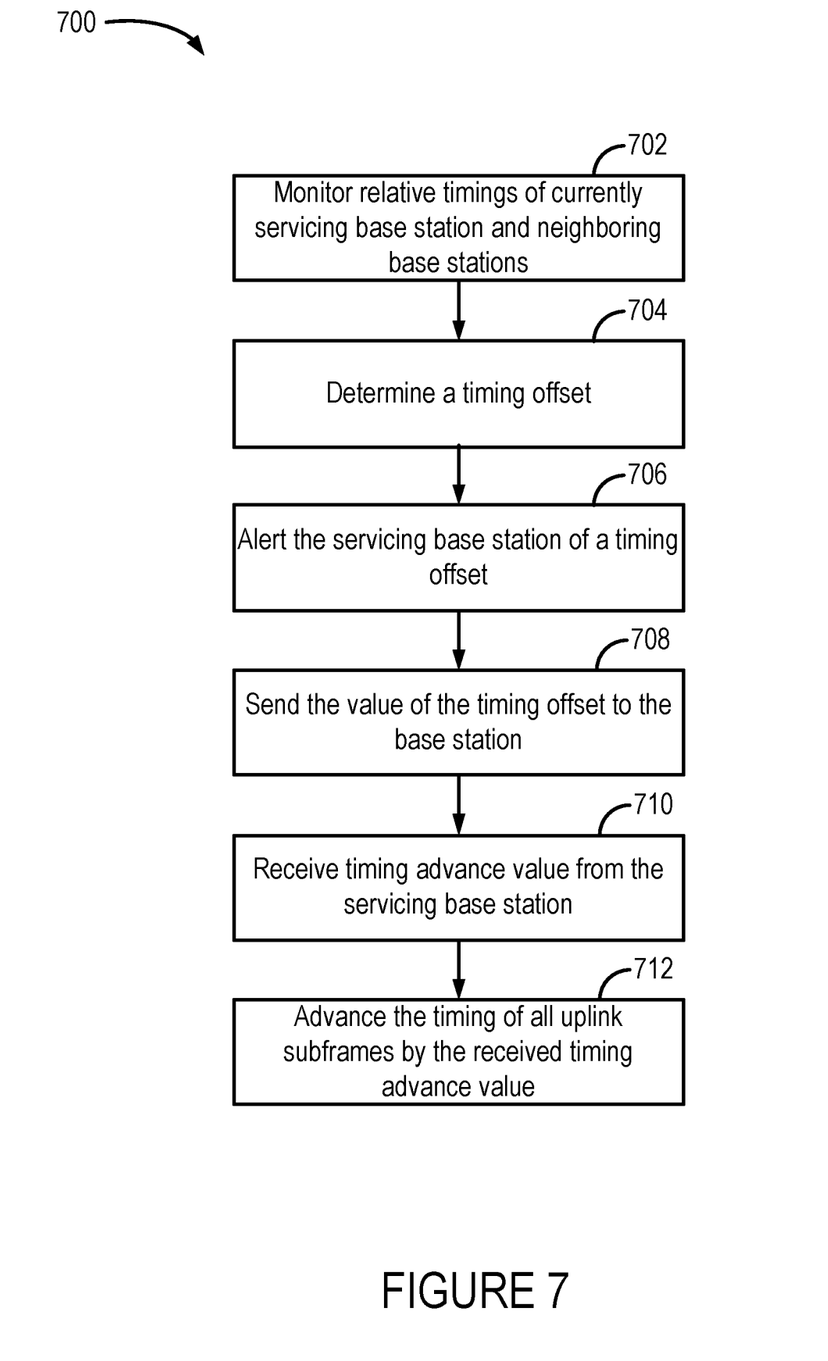
FIG. 7 shows a flowchart of an example process to be executed by a user equipment for mitigating interference.

FIG. 7 shows a flowchart of an example process 700 for mitigating interference. In particular, the process 700 can be utilized by user equipment, such as UE1 106 and UE2 108 shown in FIG. 1. The process 700 includes monitoring relative timings of a currently servicing base station and neighboring base stations (stage 702). As an example of this process stage, FIG. 5 shows UE2 108 monitoring the transmissions from both the servicing base station BS2 104 and the neighboring base station BS1 102. The process 700 further includes determining a timing offset value (stage 704). As an example of this process stage, FIG. 5 show UE2 108 determining the timing offset $t_d$ based on the timing of the frame structure of BS1 102 and the timing of the frame structure of BS2 104. The process 700 further includes alerting the servicing base station of a timing offset (stage 706). One example of this process stage is shown in FIG. 5, where UE2 108 alerts (510) the servicing base station BS2 104 that a timing offset has been detected. The process 700 also includes sending the value of the timing offset to the base station (stage 708). As shown in FIG. 5, by way of example, UE2 108 sends (510) the value of the timing offset $t_d$ to the servicing base station BS2 104. The process 700 further includes receiving timing advance value from the servicing base station (stage 710). As an example, FIG. 5 shows UE2 108 receiving (516) the timing advance value $t_{adv}$ from the servicing base station BS2 104. The process 700 also includes advancing the timing of all uplink subframes by the received timing advance value (stage 712). As an example, FIG. 4 shows the frame structure 308 of UE2 108, in which the timing of the UL subframe 318 (and the remaining UL subframes) is advanced by the received timing advance value.

Figure 8:
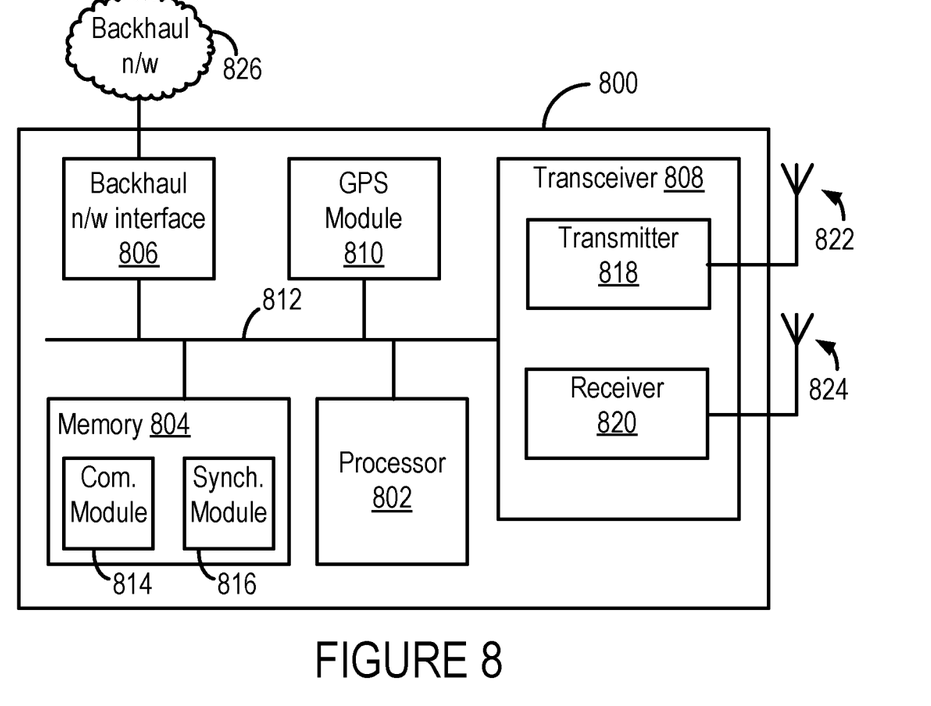
FIG. 8 shows a block diagram of an example base station.

FIG. 8 shows a block diagram of an example base station 800. In particular, the base station 800 can be utilized to implement BS1 102 and BS2 104 shown in FIG. 1. The base station 800 can include a processor 802, a memory 804, a backhaul network interface 806, a transceiver 808, a GPS module 810, and a communication bus 812. The processor 802 can perform actions in accordance with instructions stored in the memory 804. The processor 802 can access instructions in memory 804 via the communication bus 812. The processor 802 can also communicate with other modules of the base station 800 via the communication bus 812. In some implementations, the processor 802 can include one or more processor cores, co-processors, digital signal processors, digital filters, etc., that can perform communication and computing operations for the operation of the base station 800. In particular, the processor 802 can execute instructions stored in a communication module 814 and a synchronization module 816.

The transceiver 808 can include a transmitter 818 and a receiver 820. The transmitter 818 can receive data and control signals from the processor 802, or from other modules within the base station 800, and transmit the data and/or control signals via the transmitting antenna 822. The receiver 820 can be utilized to receive data and/or control signals via the receiving antenna 824, and communicate the received data signals to the processor 802 and other modules of the base station 800. In some implementations, the transmitter 818 can receive digital data, which can be processed and converted into electromagnetic signals for transmission. In some implementations, the processing and conversion can include modulation, filtering, equalization, encoding, error correction, etc. Similarly, the receiver 820 can receive electromagnetic signals, which can be converted and processed into digital data, where the processing and conversion can include demodulation, filtering, decoding, error correction, etc. In some implementations, the receiver 820 and the transmitter 818 can be powered-up and powered-down based on control signals or instructions received from the processor 802. In some implementations, the receiver 820 and the transmitter 818 can be configured based on 3GPP specifications to support communications utilizing one or more of GSM (GPRS and EDGE), W-CDMA, HSPA, LTE, LTE-Advanced, UTRAN, UMTS, and FOMA protocols.

As mentioned above, the memory 804 can include a communication module 814 and a synchronization module 816. The communication module can 814 include instructions that when executed by the processor 802 enable the base station to provide communication service to various user equipment. In particular, the communication module can include instruction based on the 3GPP specification to support various communication protocols mentioned above. The synchronization module 816 can include instructions for synchronization of the base station communication signals with the communication signals of neighboring base stations. In some implementations, the synchronization module 816 can include instructions to utilize the GPS module 810 and the backhaul network interface 806 to synchronize the frame structure timing of the base station 800 with the frame structure timing of other base stations. For example, the synchronization module 816 can include instructions to implement the IEEE 1588 protocol or the LTE X2 link, discussed above, to utilize a backhaul network 826 to exchange synchronization and timing information with other base stations. In some implementations, the synchronization module 816 can include instructions to execute processes 500 and 600 discussed above in relation to FIGS. 5 and 6, respectively, to reduce interference.

Figure 9:
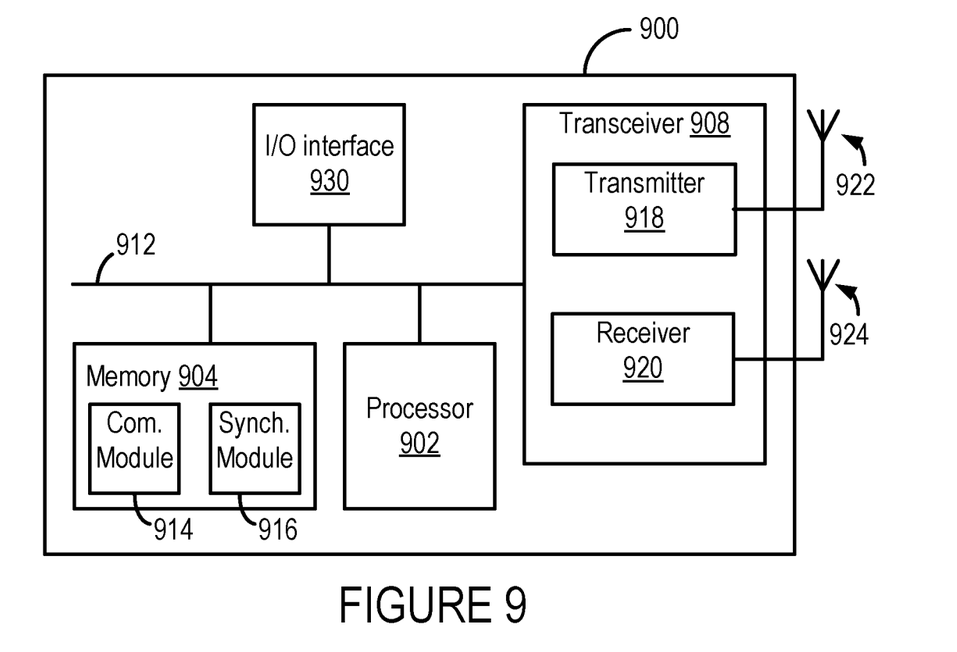
FIG. 9 shows a block diagram of an example user equipment.

FIG. 9 shows a block diagram of an example user equipment 900. In particular, the user equipment (UE) 900 shown in FIG. 9 can be utilized for implementing UE1 106 and UE2 108 shown in FIG. 1. The UE 900 can include a processor 902, a memory 904, a transceiver 908, a communication bus 912, and an i/o interface 930. The processor 802 can perform actions in accordance with instructions stored in the memory 804. The processor 902 can access instructions in memory 904 via the communication bus 912. The processor 902 can also communicate with other modules of the UE 900 via the communication bus 912. In some implementations, the processor 902 can include one or more processor cores, co-processors, digital signal processors, digital filters, etc., that can perform communication and computing operations for the operation of the UE 900. In particular, the processor 902 can execute instructions stored in a UE communication module 914 and a UE synchronization module 916.

The transceiver 908 can include a transmitter 918 and a receiver 920. The transmitter 918 can receive data and control signals from the processor 902, or from other modules within the UE 900, and transmit the data and/or control signals via the transmitting antenna 922. The receiver 920 can be utilized to receive data and/or control signals via the receiving antenna 924, and communicate the received data signals to the processor 902 and other modules of the UE 900. In some implementations, the transmitter 918 can receive digital data, which can be processed and converted into electromagnetic signals for transmission. In some implementations, the processing and conversion can include modulation, filtering, equalization, encoding, error correction, etc. Similarly, the receiver 920 can receive electromagnetic signals, which can be processed and converted into digital data, where the conversion and processing can include demodulation, filtering, decoding, error correction, etc. In some implementations, the receiver 920 and the transmitter 918 can be powered-up and powered-down based on control signals or instructions received from the processor 902. In some implementations, the receiver 920 and the transmitter 918 can be configured based on 3GPP specifications to support communications utilizing one or more of GSM (GPRS and EDGE), W-CDMA, HSPA, LTE, LTE-Advanced, UTRAN, UMTS, and FOMA protocols.

As mentioned above, the memory 904 can include the UE communication module 914 and the UE synchronization module 916. The UE communication module 914 can include instructions that when executed by the processor 902 enable the UE 900 to communicate with one or more base stations. In particular, the UE communication module 914 can include instructions based on the 3GPP specification to support various communication protocols mentioned above. In some implementations, the UE synchronization module 916 can include instructions for executing the process 700 discussed above in relation to FIG. 7 for mitigating interference. The UE 900 also can include an i/o interface 930 to receive input from and send output to various i/o devices such as display screens, keyboards, mics, speakers, etc., connected to the UE 900.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for reducing communication interference, comprising:
    determining, at a first base station servicing a first user equipment, a synchronization error between a timing of a communication between the first base station and the first user equipment and a timing of a communication between a second base station and a second user equipment different from the first user equipment, wherein the synchronization error is represented by a timing offset value; and
    in response to determining the synchronization error, sending, from the first base station to the first user equipment, a timing advance value and instructions to advance by the timing advance value a window of time during which the first user equipment transmits uplink signals to the first base station, wherein the timing advance value is based on the timing offset value such that interferences caused by a lack of synchronization between frame structures of neighboring base station—user equipment pairs can be reduced or eliminated.

2. The method of claim 1, further comprising, in response to determining the synchronization error, advancing by the timing offset value a window of time at the first base station during which the first base station receives uplink signals from the first user equipment.

3. The method of claim 1, wherein determining a synchronization error, at the first base station servicing the first user equipment, includes receiving at the first base station a message indicating the synchronization error from the first user equipment.

4. The method of claim 3, further comprising receiving, at the first base station, the timing offset value from the first user equipment.

5. The method of claim 1, wherein sending, from the first base station to the first user equipment, the timing advance value includes sending the timing advance value based on a sum of the timing offset value and a propagation delay of signal transmission between the first base station and the first user equipment.

6. The method of claim 2, wherein advancing by the timing offset value the window of time at the first base station during which the first base station receives uplink signals from the first user equipment includes increasing a gap period between the window of time during which the first base station receives uplink signals and a window of time during which the first base station transmits downlink signals to the first user equipment by the timing offset value.

7. The method of claim 6, wherein determining, at the first base station, the synchronization error includes receiving a message from the second base station and determining the synchronization error based on the received message.

8. The method of claim 7, wherein receiving the message from the second base station includes receiving the message from the second base station via a backhaul network.

9. The method of claim 1, further comprising, in response to determining the synchronization error, sending, from the first base station, a message to each of a plurality of base stations instructing the plurality of base stations to advance, by the timing offset value, a window of time during which each of the plurality of base stations receives uplink signals from its respective user equipment.

10. A first base station communicating with a first user equipment, comprising:
    a communication interface configured to send and receive communications; and
    a processor coupled to the communication interface, configured to:
        determine a synchronization error between a timing of a communication between the first bases station and the first user equipment and a timing of a communication between a second base station and a second user equipment different from the first user equipment, wherein the synchronization error is represented by a timing offset value; and
        in response to determining the synchronization error, send to the first user equipment a timing advance value and instructions to advance, by the timing advance value, a window of time during which the first user equipment transmits uplink signals to the first base station, wherein the timing advance value is based on the timing offset value such that interferences caused by a lack of synchronization between frame structures of neighboring base station—user equipment pairs can be reduced or eliminated.

11. The first base station of claim 10, wherein the processor is further configured to, in response to determining the synchronization error advance by the timing offset value a window of time during which uplink signals are received from the first user equipment.

12. The first base station of claim 10, wherein the communication interface includes a receiver configured to receive uplink signals from the first user equipment, and wherein the processor is configured to receive a message from the first user equipment via the receiver indicating the synchronization error.

13. The first base station of claim 11, wherein the processor is further configured to receive the timing offset value from the first user equipment via the receiver.

14. The first base station of claim 11, wherein the processor is further configured to determine the timing advance value sent to the first user equipment by adding the timing offset value to propagation delay of signal transmission between the first base station and the first user equipment.

15. The first base station of claim 11, wherein the processor is further configured to advance, by a timing offset value, a window of time during which uplink signals are received from the first user equipment by increasing a gap period between the window of time during which the first base station receives uplink signals and a window of time during which the first base station transmits downlink signals to the first user equipment by the timing offset value.

16. The first base station of claim 10, wherein the communication interface includes a backhaul network interface for connecting to a backhaul network, and wherein the message is received from the second base station via the backhaul network interface.

17. The first base station of claim 10, wherein the processor is further configured to, in response to determining the synchronization error, send a message to each of a plurality of base stations instructing the plurality of base stations to advance, by the timing offset value, a window of time during which each of the plurality of base stations receives uplink signals from its respective user equipment.

18. A method for reducing interference in a communication network, comprising:
  determining, at a first user equipment being served by a first base station, a timing offset representing a synchronization error between a timing of a communication between the first base station and the first user equipment and a timing of a communication between a second base station and a second user equipment different from the first user equipment;
  sending, from the first user equipment to the first base station, the determined timing offset;
  receiving, in response to the sending of the determined timing offset, a timing advance value from the first base station; and
  advancing, at the first user equipment, by the timing advance value, a window of time during which the first user equipment transmits uplink signals to the first base station, wherein the timing advance value is greater than a propagation delay of signal transmission between the first base station and the first user equipment such that interferences caused by a lack of synchronization between frame structures of neighboring base station—user equipment pairs can be reduced or eliminated.

19. The method of claim 18, wherein advancing, at the first user equipment, by the timing advance value, the window of time during which the first user equipment transmits uplink signals to the first base station includes increasing a gap period between the window of time during which the first user equipment transmits uplink signals to the first base station and a window of time during which the first user equipment receives downlink signals from the first base station.

20. A first user equipment communicating with a first base station, comprising:
  a transmitter configured to transmit uplink signals to the first base station, the first base station currently servicing the first user equipment;
  a receiver configured to receive communication signals from the first base station and communication signals from a second base station; and
  a processor coupled to the transmitter and receiver, configured to:
    determine a timing offset representing a synchronization error between a timing of the communication signals received from the first base station and a timing of a communication between the second base station and a second user equipment different from the first user equipment;
    send, via the transmitter, the determined timing offset to the first base station;
    receive, in response to sending of the determined timing offset, a timing advance value from the first base station; and
    advance, by the received timing advance value, a window of time during which uplink signals are transmitted to the first base station, wherein the timing advance value is greater than a propagation delay of signal transmission between the first base station and the first user equipment such that interferences caused by a lack of synchronization between frame structures of neighboring base station—user equipment pairs can be reduced or eliminated.

21. The first user equipment of claim 20, wherein the processor is configured to advance, by the received timing advance value, the window of time during which uplink signals are transmitted to the first base station by increasing a gap period between the window of time during which the first user equipment transmits uplink signals to the first base station and a window of time during which the first user equipment receives downlink signals from the first base station.

* * * * *